United States Patent [19]

Benedikt

[11] 4,452,953

[45] Jun. 5, 1984

[54] PROCESS FOR THE VAPOR PHASE CHLOROSULFONATION OF POLYOLEFINS IN THE PRESENCE OF FINELY DIVIDED INORGANIC MATERIALS

[75] Inventor: George M. Benedikt, Lakewood, Ohio

[73] Assignee: The B. F. Goodrich Company, Akron, Ohio

[21] Appl. No.: 402,475

[22] Filed: Jul. 28, 1982

[51] Int. Cl.$^3$ ................................................ C08F 8/38
[52] U.S. Cl. .................................. 525/344; 524/581; 525/333.9
[58] Field of Search ........................................ 525/344

[56] References Cited

U.S. PATENT DOCUMENTS

| | | | |
|---|---|---|---|
| 2,928,819 | 3/1960 | Noeske | 525/357 |
| 3,206,444 | 9/1965 | Gumboldt | 525/356 |
| 3,624,054 | 11/1971 | Barton | 525/344 |
| 3,759,888 | 9/1973 | Nose | 525/356 |

FOREIGN PATENT DOCUMENTS 1415236 11/1975 United Kingdom ................ 525/356

*Primary Examiner*—C. A. Henderson
*Attorney, Agent, or Firm*—J. Hughes Powell, Jr.

[57] ABSTRACT

An improved vapor phase process for chlorosulfonation of polyethylene, particularly in a fluidized bed, is accomplished by treating a mixture of powdered polyethylene, and finely divided inorganic compounds having a dielectric constant of greater than about 40 and specific conductivity greater than $10^{-13}$ to less than $10^{-1}$ ($\Omega^{-1}$ cm$^{-1}$), such as titanium dioxide, with chlorine and sulfur dioxide, optionally under actinic light, at an initial temperature from about 20° C. to about 70° C. and raising the temperature of the reaction to at least about the crystalline melting point of the polyethylene and continuing the reaction until the polyethylene contains about 25 to 45 weight percent bound chlorine and 0.5 to 3 weight percent sulfur to provide improved vulcanizable elastomers. In the fluidized bed process, improvement is obtained in bed mixing and heat transfer, with minimum polymer deposition on reactor walls and polymer agglomeration, essentially eliminating channeling and bed breakdown.

11 Claims, No Drawings

PROCESS FOR THE VAPOR PHASE CHLOROSULFONATION OF POLYOLEFINS IN THE PRESENCE OF FINELY DIVIDED INORGANIC MATERIALS

BACKGROUND OF THE INVENTION

Chlorosulfonated polyethylene elastomers are manufactured by dissolving polyethylene in a solvent such as carbon tetrachloride, along with a catalyst, and bubbling chlorine and sulfur dioxide through the solution to obtain a polymer containing about 20 to 40 percent chlorine and about 1 to 2 percent sulfur present in secondary sulfonyl chloride groups. The chlorosulfonated polyethylene is isolated from the solvent and dried. The use of a solvent requires large equipment for handling the dilute solutions; more equipment to isolate the polymer from the solvent, and still more equipment to recover and purify the solvent for reuse. In addition to processing and utilities costs, chlorinated solvents present toxicological problems. In large scale applications it is necessary to protect workers and to prevent contamination of the atmosphere with carbon tetrachloride or other solvents. Further, chlorosulfonation in solution is difficult with many high molecular weight, high density polyolefins.

PRIOR ART STATEMENT

A process that eliminates the need for a solvent is described in British Patent Specification No. 815,234, whereby polyethylene of a particle size not greater than 0.25 mm, and in the absnece of a solvent or other liquid phase, is treated with a gaseous mixture of chlorine and sulfur dioxide at a temperature not substantially above 100° C., preferably at 40°–80° C. The ratio of sulfur dioxide to chlorine is a mol ratio of 1:1 and 2:1, and the resulting polymers have sulfur contents as high as 10% and chlorine contents as high as about 20% by weight. While this represents an improvement over the solution methods, the resulting polymer products are not uniformly chlorosulfonated and result in poor stability, processing and other problems, as well as not providing chlorosulfonated elastomers that can be vulcanized to obtain optimum physical properties and in forms for a variety of applications.

There is described in U.S. Pat. No. 3,258,445, an improved process that eliminates some of the processing disadvantages of the earlier solvent-free systems by chlorosulfonating the polyolefin in finely divided form in the presence of quaternary ammonium salts or tertiary amines at a temperature which is above or equal to the starting temperature of the endothermal fusion phenomenon characteristic of the polymer treated. This process is conducted in two stages, in a first stage at a temperature below the lower temperature limit of the melting range of the polymer, partially chlorinating the polymer, then adding the quaternary ammonium salt or amine and raising the temperature as high as the lower temperature limit of the melting range of the polymer and adding a mixture of chlorine and sulfur dioxide. In chlorosulfonating at high temperatures, the polymer may deteriorate and the particles form small balls or adhere to the walls of the reactor. A disadvantage of this complex process is that there is a loss in thermal stability of the chlorosulfonated polyolefin containing the quaternary ammonium salts or amine. The organic additives may form toxic by-products during the reaction.

Another attempt to eliminate problems in fluid bed processes for chlorosulfonating polyethylene is described in U.S. Pat. No. 2,928,819 wherein the use of 50% or more by weight of magnesia, aluminum sulfate, sodium chloride and the like is proposed, but the use of such large amounts of inorganic materials also introduce handling and other problems, including separation of these materials from the polymer and are not satisfactory for a commercial process.

British Patent Specification No. 1,415,236 discloses a method for the low temperature post chlorination in the dry state of polyvinyl chloride (PVC) in the presence of pigments known for use in subsequent compounding the chlorinated PVC. Carbon black and titanium dioxide are listed as such compounding pigments for chlorinated PVC. These are used in the chlorination process in amounts as little as 0.001 part per 100 parts of resin. The examples show use of 0.02 parts of carbon black, 0.01 part of titanium dioxide, and use of 0.01 part of carbon black and 0.05 part ot titanium dioxide together at a chlorination temperature of 50° C.

SUMMARY OF THE INVENTION

Finely divided polyethylene is chlorosulfonated with chlorine and sulfur dioxide in vapor phase in the presence of an inorganic compound inert under free radical reaction conditions and having a dielectric constant of greater than about 40 and a specific conductivity of ($\Omega^{-1}\text{cm}^{-1}$) value of greater than $10^{-13}$ but less than $10^{-1}$, at an initial temperature between about 20° C. and 70° C. and thereafter at temperature of at least about the crystalline melting point of the polyethylene and continuing the reaction to obtain a stable chlorosulfonated polyethylene elastomer containing about 25 to about 45 weight percent chlorine and 0.5 to 3 weight percent sulfur, having good processing properties and that can be readily cured to form vulcanizates useful in a variety of applications.

DETAILED DESCRIPTION

Any polyethylene can be used including low and high density, linear and branched, made by high and low pressure processes. The polyethylene used may have a molecular weight from about 20,000 to several million, preferably from 50,000 to 200,000. The melt index will range from 0.01 to less than 30, preferably from 0.2 to 18. The density may be from about 0.90 to 0.97, preferably 0.93 to 0.965, and the crystalline melting point from about 100° C. to 140° C., preferably 120° C. to 136° C. The average particle size will be from greater than 50, preferably greater than 75 to less than 800 microns, preferably 100 microns to less than 600 microns. For uniform chlorine contents it is preferred to use polyethylenes with a narrow range of average particle sizes no greater than about 200 microns, more preferably no greater than 100 microns, based on the average particle size. For example, a polyethylene with a mixture of particle sizes from 100 to 250 microns is satisfactory, as is a mixture of sizes from 500 to 600 microns, although the larger particle size may require a longer reaction time to reach the desired chlorine and sulfur content. The term polyethylene is understood to include copolymers of ethylene with other alpha olefins, preferably containing 3 to 6 carbon atoms and in amounts less than 10 weight percent, for example, 5% butene-1. Other polyolefins include polypropylene and polybutene-1.

The inorganic compounds used have dielectric constants of greater than about 40, preferably greater than 80, specific conductivity values of greater than $10^{-13}$ but less than $10^{-1}$ ($\Omega^{-1}cm^{-1}$) in the temperature range from 20°-140° C. Contemplated are compounds that meet these requirements and have the general formula $ABO_3$ wherein A is Na, K, Rb, Ca, Bi, Sr, Ba, Pb, Gd; and B is Ti, Sn, Zr, Nb, Ta, W; and mixed compounds wherein A and B can be more than one element as Pb(Zr, Ti)O$_3$. (See Chapter on "Ferroelectrics", Kirk-Othmer ENCYCLOPEDIA OF CHEMICAL TECHNOLOGY, Third Edition, Vol. 10, pages 1 to 30, published 1980, by John Wiley & Sons, New York.) Such materials include titanium compounds such as titanium dioxide, barium titanate, lead litanate, barium-lead titanate-niobate and the like. These materials all meet the above criteria. These additives preferably are inert to sulfur dioxide, chlorine and hydrogen chloride under the described reaction conditions. Inorganic materials that do not meet these criteria and are otherwise unsatisfactory in the process of this invention are silica, a 4.5 dielectric constant; barium sulfate, a 11.4 dielectric constant; calcium carbonate, a 6.0 dielectric constant. Titanium compounds are preferred.

Particularly useful are rutile type titanium dioxide and barium titanate. The amounts used will be from at least 1 to about 10 to 15 or more weight parts per 100 weight parts of polyethylene. Large amounts may be used in desired, but are not normally necessary. The particle size is from about 0.01 to 10 microns, preferably 2 microns, as 0.2 to 2 microns. Particularly useful are particles of 0.2±0.05 microns size.

The ratio of chlorine to sulfur dioxide used on a volume basis at standard temperature and pressure (25° C., 01 Mla) has an effect on the final composition of the polymer as to chlorine and sulfur content, and it may vary from 20:1 to 1:2, preferably 4:1 to 1:1 of chlorine to sulfur dioxide. The reaction is generally continued until the polymers contain between 25 and 45 weight percent chlorine and this is determined by the change in polymer desity, the amount of HCl evolved during the chlorosulfonation, etc. The ratio may be varied during the course of the reaction, and all of the $SO_2$ may be added in the initial or later part of the reaction.

While an inert diluent gas is not necessary, inert gases such as nitrogen, carbon dioxide and the like may be used. Unreacted $SO_2$ and $Cl_2$ may be recycled, and this may include some HCl byproduct which will build up over a period of time. This normally is bled off to keep the concentration in the reactor at a concentration of less then 50%, HCl, preferably about 25 to 30%. In the process, minimum concentration of oxygen should be in the feed streams and reactor. The maximum amount of oxygen in the reactor should be below 300 ppm, preferably below 150 ppm.

The chlorosulfonation is started at a temperature between about 20° C. and 70° C. and the temperature is raised to at least about the crystalline melting point of the polyethylene. The usual operating temperature of the reaction at this stage after the polyethylene contains about than 15 to 25 weight percent chlorine is about 10° C. above the initial polyethylene crystalline melting point, or about 110° C. to about 150° C., depending on the initial polyethylene melting point. One benchmark to use in determining at what point to raise the reaction temperature is when the polyethylene contains greater than about 20 weight percent bound chlorine.

Vapor phase bulk chlorosulfonation of polyethylene in accordance with this invention is contemplated for a variety of conditions and equipment, both batch and continuous. Any means known to those skilled in the art for vapor phase chlorosulfonation of polyolefins may be used to conduct the reaction, for example, a rotary drum, a moving bed, horizontal stirred reactor, but more preferably in a fluidized bed of the polyehtylene and defined inorganic compound. The fluidized bed reaction normally is conducted at about atmospheric pressure and typically at superficial velocities of reactant gases of about 0.2 to 5 feet per second, preferably about 1 to 1.5 feet per second.

Light can be used to initiate the reaction in order to increase the rate of reaction. While light from daylight sources, incandescent bulbs and the like may be used, ultraviolet light is more efficient and this is preferably used initially in the reaction at least until the reaction temperature has reached the polyolefin melting point and may be used throughout the reaction. The reaction can also be initiated by generating free radicals thermally as by decomposition of peroxide or azo catalysts. Thermally generated chlorine radicals are also sufficient to initiate the reaction.

At the conclusion of the reaction, the polymer is removed from the reactor and the unreacted and by-product gases must be removed as by stripping. The reaction temperature of the polymer is preferably lowered to about 80° C. to 110° C., and the polymer is purged with nitrogen or stripped under vacuum to remove unreacted $SO_2$, $Cl_2$, and byproduct HCl.

In the fluidized bed process for chlorosulfonation of polyethylene mixed with the defined inorganic compounds, improvement is obtained in bed mixing of the reactants and heat transfer, with minimum polymer deposition on reactor walls and minimum agglomeration in the fluidized bed, essentially eliminating undesirable channeling and bed breakdown, to provide an improved process and product.

The resulting chlorosulfonated polyolefins contain about 25 to about 45 weight percent chlorine, with the optimum being about 35 to 38 weight percent. The sulfur, present as $SO_2Cl$, calculated as sulfur, will range from about 0.5 to 3 weight percent, which results in a vulcanizable elastomer that can be cured in many ways, including metal oxide-sulfur cures, The resulting elastomers have a 4 minute ML Mooney value at 100° C. of about 15 to 150, normally about 35 to 120.

In the following examples the powdered polyethylene was blended with titanium dioxide or barium titanate as described and charged to a fluid bed reactor and purged with nitrogen. The reactions were started at room temperature by introducing chlorine and sulfur dioxide. The temperature of the bed was increased by heating the reactor with a circulating bath and heating the incoming gases. As the temperature reached the melting point of the polyolefin, the bed and reaction temperature was controlled by the temperature of the circulating bath and/or diluting the reactants with nitrogen. The end of the reaction was determined by the total uptake of chlorine required to reach the desired chlorine content. The maximum temperature is maintained near or above the melting temperature of the polyolefin to assure a reduced residual crystallinity, and at a chlorine content of about 36%, elastomeric behavior. At the end of the reaction a purge with nitrogen at about 110° C. degasses the polymer powder to contain less than 40 ppm of Cl, $SO_2$ and HCl, preferably less than 10 ppm. The resulting products were white or light tan.

EXAMPLE I 70 grams of high density polyethylene powder having a density of 0.952, a crystalline melting point of 134° C. by differential scanning calorimetry, a melt index of 0.8 and a particle size of 125-250 microns was dry blended with 2.1 grams of titanium dioxide (rutile, particle size 0.18 microns) and placed in a 2" diameter glass fluid bed column provided with a heating jacket through which silicon oil was circulated. The fluid bed was connected to a cyclone and further to a caustic scrubber. The fluid bed was provided on the outside with a source of UV light having the main wavelength at 356 nanometers. The powder was fluidized for 30 minutes by passing approximately 10 liters per minute of nitrogen during which time the oxygen was removed. A mixture of 13 liters per minute of chlorine having less than 100 ppm oxygen and 6 liters per minute of sulfur dioxide having less than 100 ppm oxygen was used as both fluidizing and reactive medium. The mixture was admitted into the reactor at room temperature. The temperature of the fluid bed increased rapidly to 46° C. after which it started to decrease. At this point, heat was provided via the jacket and incoming gases so that the temperature of the bed reached 125° C. within 55 minutes from the start. At this point, the reaction exotherm brought the bed to 133° at 60 minutes and to 142° at 70 minutes. This temperature was further maintained by proper cooling and/or by temporary change of chlorine to sulfur dioxide ratio. The reaction was stopped at 77 minutes. The course of the reaction was followed by the density of powder samples extracted from the bed. The final product was white and contained 39% chlorine and 2% sulfur (as sulfonyl chloride group). It was completely soluble in toluene at 50° C, (except the inorganic additive) and it has a residual crystallinity below 2%. The polymer has a Mooney value (ML 5+4@100° C. ASTM No. D1646) of 120.

EXAMPLE II

Example I was repeated but without titanium dioxide. As the reaction progressed, a layer of polymer material was deposited on the reactor wall, and at 125° C., the polymer started to agglomerate and the fluidized bed broke down and the reaction had to be stopped.

EXAMPLE III

Example I was repeated using a high density polyethylene powder having a density of 0.952, a melt index of 4.3, and a particle size of 125-250 microns. The maximum temperature reached was 145° and after 72 minutes the product contained 37% chlorine and 1.8% sulfur and had a residual crystallinity as measured by DSC of under 2%. It was completely soluble in toluene at 50° C. The Mooney value was 91.

EXAMPLE IV

Example I was repeated using a high density polyethylene having a density of 0.955, a melt index of 15 and a crystalline melting point by DSC of 130° C. It had a particle size of 125-250 microns. During the reaction the fluid bed showed excellent axial mixing with no deposits on the reactor wall and very good heat transfer to the reactor jacket. The highest temperature reached was 141° C. and after 75 minutes the product contained 38% chlorine and 2.3% sulfur. It was completely soluble in toluene at 50° C., and had a residual crystallinity of 2%. The Mooney value was 40.

EXAMPLE V

Example III was repeated using nitrogen as diluent of the chlorine/sulfur dioxide mixture. The gas mixture consisted of 8 liters per minute chlorine, 7 liters per minute sulfur dioxide and 8 liters per minute nitrogen. The temperature of the bed was slowly brought to 125° C. (within 60 minutes) after which the reaction exotherm supplied the additional heat to bring the temperature to 146° C. After reaching this temperature at 18 minutes, the bed was cooled to 130° and maintained there until the end of the reaction. After a total reaction time of 105 minutes the composition of the product was 38.6% chlorine and 1.5% sulfur. It was white and had a residual crystallinity by DSC of below 2%.

EXAMPLE VI

Example III was repeated by replacing the titanium dioxide with barium titanate, particle size 0.9 microns, at 10 phr. An excellently mixing fluid base was observed throughout the run. The maximum temperature reached was 146° C. and after a total time of 72 minutes the product contained 37.5% Cl and 1.7% S. The polymer was completely soluble in toluene at 50° C. and it had a residual crystallinity of 2%.

EXAMPLE VII

Example III was repeated, except that carbon black was used instead of titanium dioxide. When the temperature reached 123° C., the fluid bed agglomerated, collapsed, and the reaction had to be terminated.

EXAMPLE VIII

Example III was repeated using a larger particle size of the same high density polyethylene (297-420 microns). The flow rate was increased to 17 liters per minute chlorine and 6 liters per minute sulfur dioxide. The reaction was stopped after a total of 110 minutes. The product contained 39% chlorine and 1.4% sulfur. The residual crystallinity as measured by DSC was 7.4%. The product was 97% soluble in toluene at 50° C.

Samples of the elastomers prepared in accordance with the procedures of Examples I, III and IV were compounded in a recipe containing 100 parts per hundred of polymer (chlorosulfonated polyethylene containing from 33 to 41 weight parts chlorine and 0.8 to 2.5 weight percent sulfur), 4 weight parts of magnesium oxide, 3 weight parts of pentaerythritol, 2 weight parts of dipentamethylene thiuram tetrasulfide, and 1 weight part of a polyethylene lubricant, and samples cured under pressure at 307° C. for 30 minutes. The resulting vulcanizates had Durometer A values (ASTM D2240) of 70 to 80; Stress-Strain properties (ASTM D 412) of tensile strenths from 13.8 MPa to 17.2 MPa, elongations at break of 300 to 400 percent and 100 percent moduli of 2.1 MPa to 4.1 MPa.

EXAMPLE IX

This Example shows the variation in physical properties obtainable in chlorosulfonated polyethylene when the time of adding the sulfur dioxide is varied. Following the procedure set forth in the Examples above, polyethylene having a density of 0.952, a melt index of 4.3 and a crystalline melting point of 130° C. was chlorosulfonated while mixed with 3 weight parts of rutile titanium dioxide per 100 weight parts of polyethylene.

In Run 1 the chlorine and sulfur dioxide in a 2:1 ratio were added throughout the reaction and the reaction product contained 35.2% bound chlorine and 1.2% sulfur; in Run 2 the sulfur dioxide/chlorine addition was added in a 2:1 ratio until the reaction temperature was 115° C., then the SO₂ addition was stopped and the reaction continued with chlorine up to a temperature of 145° C. until the reaction's product contained 37% chlorine and 0.6% sulfur; and in Run 3, chlorine only was added until the reaction temperature reached about 115° C. and then sulfur dioxide was introduced in the 2:1 ratio of chlorine to sulfur dioxide until the reaction reached a temperature of about 137° C. and the reaction product contained 37% chlorine and 1% sulfur. Polymers from these 3 runs were compounded as described above and the following physical properties were obtained

|  | Run 1 | Run 2 | Run 3 |
|---|---|---|---|
| Durometer A | 90 | 89 | 83 |
| Tensile Strength - MPa | 11.7 | 8.9 | 17.8 |
| Elongation - % | 215 | 305 | 315 |
| 100% modulus - MPa | 8.2 | 5.2 | 5.6 |
| Low Temperature Brittleness °C. | −33 | −40 | −58 |

I claim:

1. In a vapor phase process for chlorosulfonating polyethylene with chlorine and sulfur dioxide, the improvement comprising conducting the chlorosulfonation reaction in a fluidized bed of powdered polyethylene and inorganic compounds consisting essentially of titanium compounds that are inert to chlorine and sulfur dioxide in the defined process, present in amounts from about 1 to 15 weight parts per 100 weight parts of polyethylene, having an average particle size of about 0.01 to 10 microns, a dielectric constant greater than about 40, and a specific conductivity ($\Omega^{-1}cm^{-1}$) value of greater than $10^{-13}$ to less than $10^{-1}$ in the temperature range of 20° to 140° C., at an initial reaction temperature of from about 20° C. to about 70° C., raising the reaction temperature to at least about the crystalline melting point of the polyethylene, the volume ratio of chlorine to sulfur dioxide being from about 20:1 to about 1:2, and continuing the reaction until the chlorosulfonated polyethylene contains greater than 25 weight percent to about 45 weight percent bound chlorine and about 0.5 to about 3 weight percent sulfur.

2. The process of claim 1 wherein the polyethylene contains less than 10 weight percent copolymerized alpha olefins containing 3 to 6 carbon atoms, has a density from about 0.92 to about 0.97, a crystalline melting point of about 100° C. to about 140° C., a melt index of 0.01 to less than 30 and a particle size from about 50 to 800 microns, the inorganic compound is selected from the group consistng of finely divided titanium dioxide, barium titanate, lead titanate and barium-lead titanate-niobate, having a dielectric constant greater than 80, present in amounts from about 1 to 10 weight parts, and the reaction temperature is raised to about 100° C. to about 150° C. to complete the chlorosulfonation of the polyethylene.

3. The process of claim 2 wherein the polyethylene is polyethylene, has a melt index from 0.2 to 18, a particle size from 100 to 600 microns and an average particle size range of 200 to 300 microns, and the volume ratio of chlorine to sulfur dioxide is from 4:1 to 1:2, and the titanium compound is titanium dioxide or barium titanate having a particle size of 0.5 to 2 microns, conducted in the presence of actinic light.

4. The process of claim 3 wherein the titanium compound is rutile titanium dioxide with a particle size of about 0.2±0.05 microns.

5. The process of claim 3 wherein the inorganic compound is barium titanate with a particle size of about 0.2±0.05.

6. A process for vapor phase chlorosulfonation or polyethylene with chlorine and sulfur dioxide comprising mixing a finely divided inorganic compound that is inert to chlorine and sulfur dioxide in the defined process, has a dielectric constant of greater than about 40, a specific conductivity ($\Omega^{-1}cm^{-1}$) value of greater than $10^{-13}$ to less than $10^{-1}$, and an average particle size of about 0.01 to 10 microns, having the general formual ABO₃ wherein A is Na, K, Rb, Ca, Bi, Sr, Ba, Pb, Gd; and B is Ti, Sn, Zr, Nb, Ta, W, and mixtures thereof, present in amounts from about 1 to 15 weight parts per 100 weight parts of polyethylene, with powdered polyetheylene and chlorosulfonating the polyethylene at an initial temperature between about 20° C. and 70° C., raising the temperature to at least about the crystalline melting point of the polyethylene and continuing the reaction to provide chlorosulfonated, vulcanizable polyethylene elastomers, containing greater than 25 weight percent to about 45 weight percent bound chlorine and about 0.5 to about 3 weight percent sulfur.

7. A process of claim 6 wherein the chlorosulfonate ion reaction is conducted in a fluidized bed, the polyethylene contains less than 10 weight percent copolymerized alpha olefins containing 3 to 6 carbon atoms, has a density from about 0.91 to about 0.97, a crystalline melting point of about 100° C. to about 140° C., a melt index of 0.01 to less than 30 and a particle size from about 50 to 800 microns, the inorganic compound is selected from the group consisting of titanium dioxide, barium titanate, lead titanate, and barium-lead titanate-niobate, having an average particle size of about 0.05 to 2 microns, the volume ratio of chlorine to sulfur dioxide is from about 20:1 to about 2:1, and the reaction temperature is raised from about 100° C. to about 120° C. to complete the chlorosulfonation of the polyethylene.

8. The process of claim 7 where in the polyethylene is polyethylene, has a melt index from 0.2 to 18, a particle size from 100 to 600 microns and an average particle size range of about 200 to 300 microns, and the volume ratio of chlorine to sulfur dioxide is from about 4:1 to 1:1 and the titanium compound is titanium dioxide or barium titanate, under actinic light.

9. The process of claim 8 wherein the inorganic compound is rutile titanium dioxide with a particle size of about 0.2±0.05 microns.

10. The process of claim 8 wherein the inorganic compound is barium titanate with a particle size of about 0.2±0.05 microns.

11. A process of claim 6 wherein the inorganic compound is a titanium compound.

* * * * *